United States Patent Office 3,686,245
Patented Aug. 22, 1972

3,686,245
HALO(HALOORGANO)BIS(TRIORGANOPHOS-PHINE)NICKEL(II) COMPLEXES FOR OLEFIN DIMERIZATION
Darryl R. Fahey, Bartlesville, Okla., assignor to Phillips Petroleum Company
No Drawing. Filed June 29, 1970, Ser. No. 50,958
Int. Cl. C07f 15/04
U.S. Cl. 260—439 R               3 Claims

ABSTRACT OF THE DISCLOSURE

Nickel complex compositions consisting of halo(haloorgano)bis(triorganophosphine)nickel(II) which are suitable as olefin dimerization catalysts when in the presence of an activating cocatalyst.

---

This invention relates to nickel complex compositions. In another aspect, this invention relates to nickel complexes which in the presence of suitable cocatalysts are capable of catalyzing the dimerization of olefins.

Methods are known in the art for the dimerization of olefinic hydrocarbons in the presence of a catalyst system containing a nickel complex. Dimerization of propylene and other lower monoolefins continues to be of interest in the synthesis of monomers for addition polymerization, as intermediates in alcohol production by the oxo process, and as intermediates in the manufacture of plasticizers, lube additives, monomers for condensation polymerization, detergent base materials, improved motor fuel and the like. This continuing interest has established a need in the art for improved nickel complex dimerization catalysts. The extent of the dimerization, as well as stability of the resulting catalyst, is greatly dependent upon the character of the components employed to produce the catalyst system. In general, substantial variations in resulting dimer product types, catalyst stability, and olefin conversion are encountered when the character of the catalyst complex is varied.

It is an object of this invention to provide a novel composition of matter capable of catalyzing the dimerization of olefins in the presence of suitable cocatalysts.

I have found that an improved dimerization of monoolefins is afforded by employing a catalyst composition consisting of an organonickel(II) complex produced by contacting certain nickel(II), triorganophosphine, aluminum alkyl, and haloorganic components. The catalyst system of my invention is characterized by increased catalytic activity, thereby affording an improved process for the dimerization of monoolefins.

The nickel complex of this invention may be represented by the following formula:

$$X(R_1)Nickel(P[R_2]_3)_2$$

where X is a halogen, $R_1$ is a halogenated aryl or a halogenated vinyl group, P is a phosphine, and $R_2$ is an aryl or an alkyl group. The complex of this invention comprises a product of the contacting, for example, nickel acetylacetonate, triphenylphosphine, triethylaluminum, and chlorotrifluoroethylene to yield chloro(trifluorovinyl)bis(triphenylphosphine)nickel(II).

Examples of the nickel compounds suitable for use in generating the complex of my invention are: nickel acetylacetonate, nickel salicylate, nickel acetate, nickel stearate, nickel oxalacetate and the like.

Another component of the catalyst system is a triorganophosphine ligand. Some examples of suitable triorganophosphines are: triethylphosphine, tributylphosphine, methyldiphenylphosphine, triphenylphosphine, and the like.

Aluminum alkyls which are suitable to employ in the preparation of the complexes include the following examples: diethylethoxyaluminum, triethylaluminum, diethylaluminum chloride, dimethylaluminum chloride, methylaluminum dichloride and mixtures thereof such as methylaluminum sesquichloride, ethylaluminum, sesquichloride and the like.

Suitable haloorganic compounds for use in preparing the complexes include 1,2,4-trichlorobenzene, chlorotrifluoroethylene, bromopentafluorobenzene, hexachlorobenzene, 1-chloro-2,6-difluorobenzene, tetrabromoethylene and the like.

The complex of my invention may be prepared by adding components separately to a reactor, preferably in a solvent such as ether, benzene, n-pentane, isopentane, cyclohexane and the like or mixtures thereof. Three of the nickel complex reactants can be charged at about 0° C. under nitrogen in any order so long as the haloorganic compound is charged after the agitated contacting of the first three reactants has been achieved. The mixture of the four reactants is then stirred under mild warming conditions of about 0 to 60° C. and for a period which is determined upon the cessation of gas evolution from the mixture. The desired nickel complex is then removed from the reaction mixture through suitable means.

The nickel complexes of my invention are capable of dimerizing olefins, e.g., propylene, in the presence of a suitable activating cocatalyst, for example, ethylaluminum dichloride.

The following examples, I through III, represent the preparation and resulting novel nickel complex of my invention which are suitable dimerization catalysts.

EXAMPLE I

Chloro(trifluorovinyl)bis(triphenylphosphine)nickel(II)

A mixture of nickel acetylacetonate (1.0 g., 3.9 mmol), triphenylphosphine (2.0 g., 7.6 mmol) and ether (5 ml.) was prepared under a nitrogen atmosphere. Triethylaluminum (3.0 ml. of a 25% solution in cyclohexane) was then added slowly to the mixture at 0° C. The solution was stirred and the gases evolved were exhausted. After standing overnight at 0° C., the dark, supernatant liquid was syringed from orange crystals of bis(triphenylphosphine)nickel ethylene, and ether (5 ml.) was added. Chlorotrifluoroethylene was bubbled into the mixture over a 1 hr. period as the reaction temperature gradually increased from 0–25° C. The mixture was diluted with benzene and warmed to 60° C. for 2 hours. After cooling to room temperature, the solution was filtered through acid-washed alumina and the filtrate was concentrated under reduced pressure. The yellow residual oil was crystallized from benzene-pentane to afford yellow crystals of chloro(trifluorovinyl)bis(triphenylphosphine)nickel(II): M.P., 120–123° C. dec. Yield, 0.20 g. (8%).

EXAMPLE II

Chloro(2-chlorophenyl)bis(triethylphosphine)nickel(II)

A mixture of nickel acetylacetonate (2.57 g., 10 mmol), triethylphosphine (2.36 g., 20 mmol), and ether (50 ml.) was prepared under an ethylene atmosphere. Diethylethoxyaluminum (10 ml. of a 25% solution in isopentane) was then added slowly to the mixture at 0° C. After standing overnight at −78° C., the system was warmed to 0° C. (venting the gases evolved), and 1-butanol (3.0 ml.) and 1,2-dichlorobenzene (3.9 g., 27 mmol) were added. The mixture was warmed to 35° C. and stirred until gas evolution ceased. The solution was washed with dilute aqueous hydrochloric acid, and the organic phase was concentrated under reduced pressure. The residue was chromatographed on acid-washed alumina. The yellowbrown residual oil eluted with 50 percent ether in pentane. Recrystallization of the solid from methanol afforded yellow crystals of chloro(2-chlorophenyl)bis(triethylphosphine)nickel(II): M.P., 91–92° C. Yield, 0.83 g. (19%).

*Analysis.*—Calcd. for $C_{18}H_{34}Cl_2NiP_2$ (percent): C, 48.91; H, 7.75. Found (percent): C, 48.81; H, 7.93.

EXAMPLE III

Chloro(2,5-dichlorophenyl)bis(triethylphosphine) nickel(II)

A mixture of nickel acetylacetonate (1.00 g., 3.9 mmol), triethylphosphine (1.70 ml., 11.68 mmol), and ether (4 ml.) was stirred at 0° C. under nitrogen and 3 ml. of a 25 percent solution of triethylaluminum in cyclohexane was added over approximately 15 minutes. Pressure was relieved. After stirring for 1 hour, 1,2,4-trichlorobenzene was added and the mixture was stirred at room temperature until gas evolution ceased. The crude mixture was shaken with dilute aqueous hydrochloric acid, separated, concentrated at reduced pressure, filtered through alumina with ether, concentrated, diluted with ethanol and refrigerated. No crystals formed. The mixture was concentrated on a rotary evaporator to a yellow oil and subjected to column chromatography on acid-washed alumina. A yellow solid was eluted with 50 percent ether in pentane. The solid was crystallized from aqueous ethanol overnight in a refrigerator. The yellow crystals (0.1 g., 5.4% yield) of chloro(2,5-dichlorophenyl)bistriethylphosphine)nickel(II) were collected on a filter and air-dried. M.P. 100–101° C.

*Analysis.*—Calcd. for $C_{18}H_{33}Cl_3NiP_2$ (percent): C, 45.37; H, 6.98. Found (percent): C, 45.8; H, 6.8.

What I claim is:
1. A halo(haloorgano)bis(triorganophosphine)nickel (II) composition comprising chloro(2,5-dichlorophenyl) bis(triethylphosphine)nickel(II).
2. A halo(haloorgano)bis(triorganophosphine)nickel (II) composition comprising chloro(trifluorovinyl)bis (triphenylphosphine)nickel(II).
3. A halo(haloorgano)bis(triorganophosphine)nickel (II) composition comprising chloro(2-chlorophenyl)bis (triethylphosphine)nickel(II).

References Cited

Bland et al: J. Chem. Soc. (A) (1968), pp. 1278–81.
Wilkinson: Platinum Metals Review 12 (1968), pp. 50–53.
Phillips et al.: J. Organometallic Chem. 2 (1964), pp. 455–460.
Hopton et al.: J. Chem. Soc. (A) (1966), pp. 1326–30.
Mackinnon et al.: Aust. J. Chem. (1968); Chem. Abst. 70 (1969), No. 475577d.
Miller et al.: J. Chem. Soc. 90 (1968), pp. 6248–50.
Ashley-Smith et al.: J. Chem Soc. (A) (1969), pp. 3019–23.

TOBIAS E. LEVOW, Primary Examiner

A. P. DEMERS, Assistant Examiner

U.S. Cl. X.R.

252—429 A, 431 P; 260—666 A